United States Patent
Nakamura

(10) Patent No.: US 11,153,114 B2
(45) Date of Patent: Oct. 19, 2021

(54) COMMUNICATION SYSTEM

(71) Applicant: Yazaki Corporation, Tokyo (JP)

(72) Inventor: Yoshihide Nakamura, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/277,369

(22) Filed: Feb. 15, 2019

(65) Prior Publication Data

US 2019/0334739 A1    Oct. 31, 2019

(30) Foreign Application Priority Data

Apr. 25, 2018  (JP) .............................. JP2018-084309

(51) Int. Cl.
| | | |
|---|---|---|
| *H04L 12/40* | (2006.01) | |
| *H04L 29/12* | (2006.01) | |
| *G06F 13/36* | (2006.01) | |
| *G06F 13/40* | (2006.01) | |
| *B60R 16/03* | (2006.01) | |

(52) U.S. Cl.
CPC .... *H04L 12/40019* (2013.01); *B60R 16/0315* (2013.01); *G06F 13/36* (2013.01); *G06F 13/4022* (2013.01); *H04L 12/40202* (2013.01); *H04L 29/12849* (2013.01); *H04L 2012/40215* (2013.01); *H04L 2012/40273* (2013.01)

(58) Field of Classification Search
CPC ......... H04L 12/40019; H04L 12/40202; H04L 29/12849; H04L 2012/40215; H04L 2012/40273; B60R 16/0315; G06F 13/36; G06F 13/4022
See application file for complete search history.

(56) References Cited

U.S. PATENT DOCUMENTS

| | | | | |
|---|---|---|---|---|
| 5,592,485 | A * | 1/1997 | Consiglieri | B60R 16/0315 340/2.1 |
| 2003/0034883 | A1* | 2/2003 | Sato | G01S 15/878 340/435 |
| 2004/0081079 | A1* | 4/2004 | Forest | H04J 3/0652 370/216 |
| 2007/0204082 | A1* | 8/2007 | Shimizu | H04L 12/403 710/110 |
| 2013/0124763 | A1* | 5/2013 | Kessler | G06F 13/4282 710/110 |
| 2013/0274897 | A1* | 10/2013 | Herthan | H04L 12/4625 700/3 |

(Continued)

FOREIGN PATENT DOCUMENTS

| | | |
|---|---|---|
| DE | 11 2012 002 587 T5 | 4/2014 |
| JP | 2010-184575 A | 8/2010 |

*Primary Examiner* — Henry Tsai
*Assistant Examiner* — Aurangzeb Hassan
(74) *Attorney, Agent, or Firm* — Sughrue Mion, PLLC

(57) ABSTRACT

In an in-vehicle network, a master device and a plurality of slave devices communicate with each other. A plurality of semiconductor relays for supplying power to the corresponding slave devices is provided for each of the plurality of slave devices in the master device. IDs corresponding to the plurality of semiconductor relays are stored in a flash ROM of the master device. The master device transmits the corresponding ID each time the semiconductor relays are turned on by sequentially turning on the semiconductor relays. The plurality of slave devices set the ID received after power supply as its own ID.

3 Claims, 4 Drawing Sheets

(56) References Cited

U.S. PATENT DOCUMENTS

| | | | |
|---|---|---|---|
| 2014/0121901 A1* | 5/2014 | Shii | G06F 1/3278 |
| | | | 701/36 |
| 2014/0281079 A1* | 9/2014 | Biskup | G06F 11/1423 |
| | | | 710/110 |
| 2015/0154136 A1* | 6/2015 | Markovic | H04L 12/6418 |
| | | | 710/317 |
| 2017/0154001 A1* | 6/2017 | Filser | G06F 13/4282 |
| 2017/0220097 A1* | 8/2017 | Lin | G06F 1/3287 |
| 2017/0220515 A1* | 8/2017 | Lin | H04L 12/40006 |
| 2017/0244477 A1* | 8/2017 | Seo | H04L 12/40 |
| 2018/0060269 A1* | 3/2018 | Kessler | G06F 13/4022 |
| 2018/0212822 A1* | 7/2018 | Ikeda | H04L 12/40 |
| 2018/0285297 A1* | 10/2018 | Chan | G06F 13/364 |

* cited by examiner

COMMUNICATION SYSTEM

TECHNICAL FIELD

The present invention relates to a communication system.

BACKGROUND ART

Various loads such as lamps and power windows are mounted on vehicles such as passenger cars and freight cars. A technique has been proposed for controlling the loads by using communication between a slave device to which a plurality of loads is connected and a master device controlling a plurality of slave devices.

In the above technique, it is necessary to set identification information (ID) in a plurality of slave devices to which a plurality of loads is connected, respectively.

As a method for setting the ID, for example, one described in Patent Literature 1 has been proposed. In the above-described ID setting method, the master device sends an ID to the slave device every time when a slave device not set with ID is connected to the in-vehicle LAN, and the slave device stores the ID.

However, since the ID is set every connection of the slave device, there is a problem that it takes time to set the ID. Also, since the order of IDs sent by the master device to the slave device is fixed, there is also a problem that if the connection order of the slave device to the in-vehicle LAN is different, an ID different from the original ID is set.

PRIOR ART DOCUMENT

Patent Literature

Patent Literature 1: JP 2010-184575 A

SUMMARY OF INVENTION

Technical Problem

The present invention has been made in view of the above-described background, and it is an object of the present invention to provide a communication system capable of shortening setting time of identification information and reducing erroneous setting.

Solution to Problem

According to a first aspect of the present invention, there is provided a communication system including a plurality of slave devices and a master device that communicates with the plurality of slave devices, wherein the master device includes: a plurality of switches provided for each of the plurality of slave devices, for supplying power to the corresponding slave devices; a storage unit for storing identification information corresponding to the plurality of switches; and a transmission unit that transmits corresponding identification information each time the switch is turned on by sequentially turning on the switch, and wherein the plurality of slave devices has a setting unit that sets the identification information received after power supply as its own identification information.

Preferably, there is provided the communication system, wherein the master device is installed in a vehicle, wherein the plurality of slave devices is connected to a plurality of loads, wherein the plurality of loads are classified into a load that can be driven at all times, a load that can be driven when an accessory is used, and a load that can be driven at the time of ignition, and wherein the loads of the same type are connected to one of the slave devices.

Preferably, there is provided the communication system, wherein a plurality of the master devices is installed in a vehicle, and wherein the identification information stored in the storage unit includes installation information indicating an installation position of the master device in the vehicle.

According to a second aspect of the present invention, there is provided a master device communicating with a plurality of slave devices, including:

a plurality of switches provided for each of the plurality of slave devices and supplying power to the corresponding slave devices;

a storage unit for storing identification information corresponding to the plurality of switches; and a transmission unit that transmits corresponding identification information corresponding to the switches each time the switches are turned on by sequentially turning on the switches.

Effect of the Invention

According to the aspects described above, it is unnecessary to assign the identification information every time the slave device is connected, and therefore, it is possible to shorten the setting time of the identification information and reduce erroneous settings.

DESCRIPTION OF EMBODIMENTS

Figure 1:
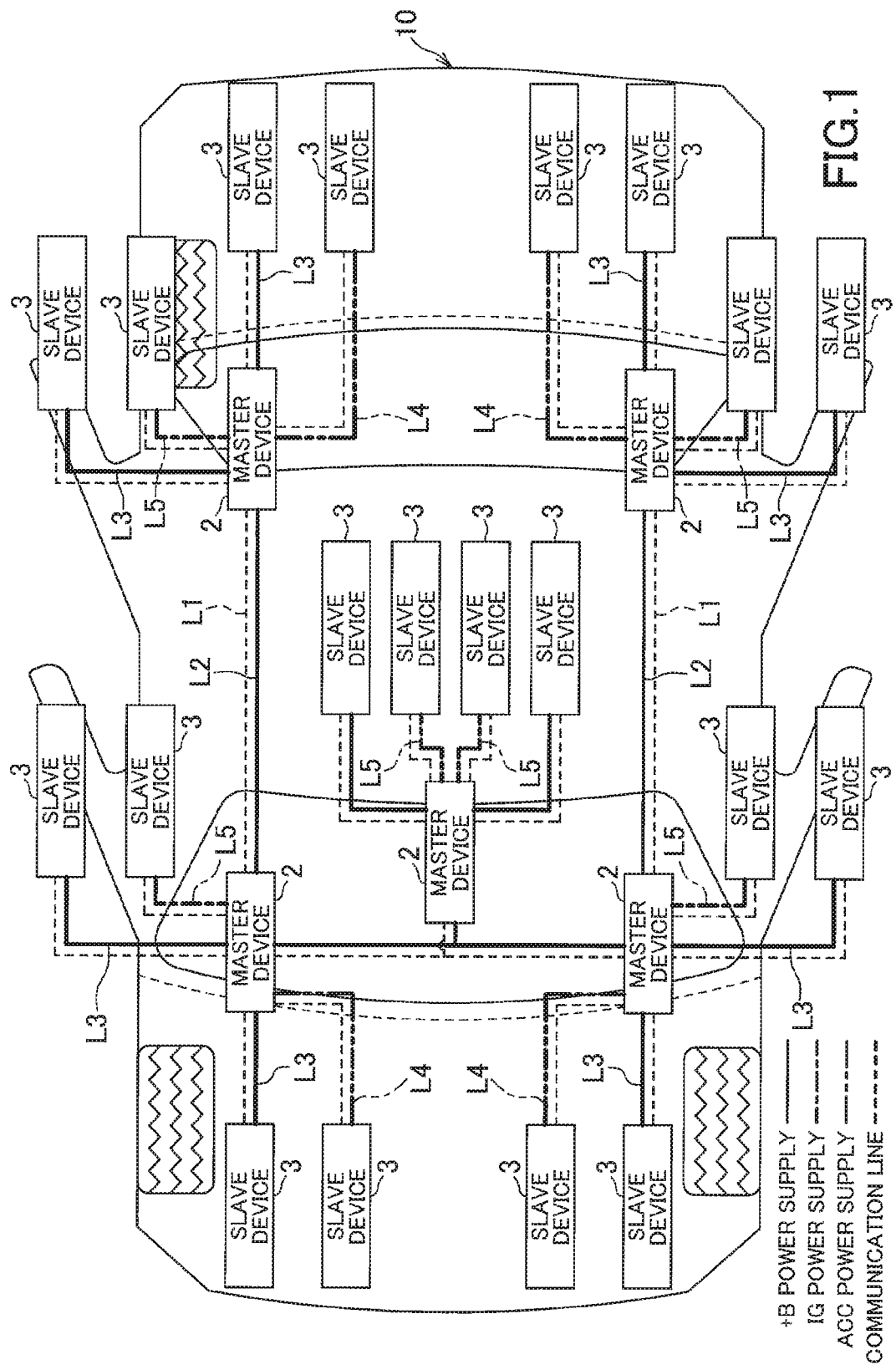
FIG. 1 is a block diagram showing an in-vehicle network as a communication system of the present invention.
Figure 2:
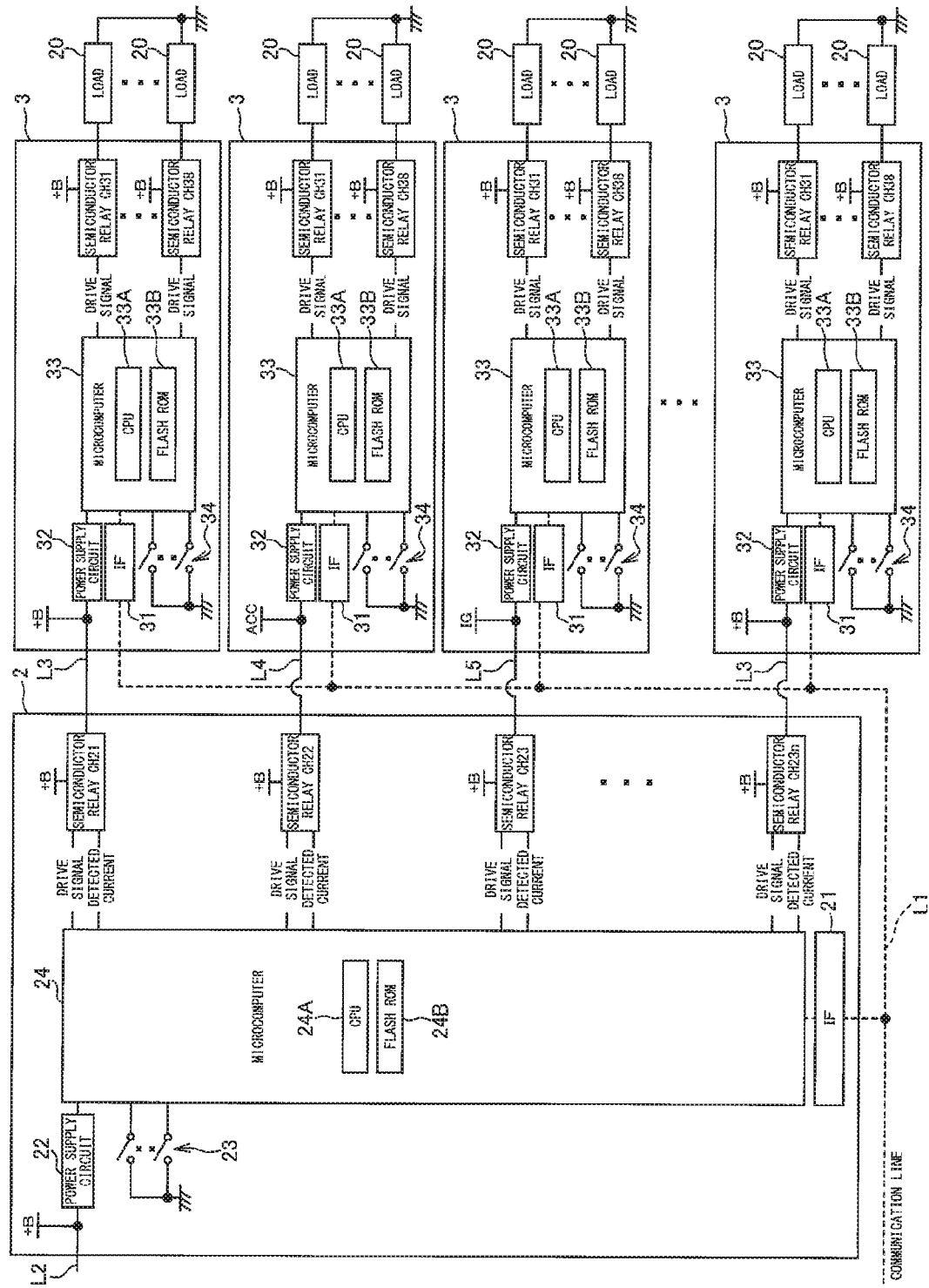
FIG. 2 is a block diagram showing a configuration of a master device and a slave device that constitute the in-vehicle network shown in FIG. 1.

Hereinafter, an embodiment of the present invention will be described with reference to FIGS. 1 and 2. FIG. 1 is a block diagram showing an in-vehicle network 1 as a communication system of the present invention. FIG. 2 is a block diagram showing a configuration of a master device 2 and a slave device 3 constituting the in-vehicle network 1 shown in FIG. 1.

The in-vehicle network 1 shown in FIG. 1 is mounted in a vehicle 10. The in-vehicle network 1 includes a plurality of master devices 2 and a plurality of slave devices 3. The plurality of master devices 2 are arranged in each area of the vehicle 10. In the present embodiment, the master devices 2 are disposed at five locations, the center of the front of the vehicle 10, the right side of the front, the left side of the front, the right side of the rear, and the left side of the rear.

The five master devices 2 are communicably connected to each other through a communication line L1. Further, the master devices 2 are connected to each other via a +B power supply line L2 connected to a battery (not shown), and power is supplied via the +B power supply line L2.

Further, each of the five master devices 2 is communicably connected to a plurality of slave devices 3 arranged in the own area through a communication line L1. The master device 2 and the slave devices 3 are connected one to many. The master device 2 controls the operations of the plurality of slave devices 3 by communicating with the plurality of slave devices 3. The slave device 3 is connected to a plurality of loads 20 (FIG. 2) such as lamps, seat motors, door motors and the like disposed in the own area, and controls the driving of the loads 20 in accordance with communication with the master device 2.

The slave devices 3 in the respective areas are used for +B connected to the load 20 that can be driven at all times, for ACC connected to the load 20 that can be driven when an accessory is used, and for IG connected to the load 20 that can be driven at the time of ignition.

Next, a configuration of the above-described master device 2 will be explained. The plurality of master devices 2 has the same configuration, and each of the plurality of master devices 2 has an interface (hereinafter referred to as I/F) 21, a power supply circuit 22, a plurality of local SWs 23, a microcomputer 24, a plurality of semiconductor relays CH21 to C2$n$ as a switch.

The I/F 21 is a communication interface for communicating with another master device 2 and a plurality of slave devices 3. The I/F 21 is an interface capable of inputting and outputting signals corresponding to various communications (CAN, LIN, and other communication methods). The power supply circuit 22 is a circuit that generates a power supply for the microcomputer 24 to be described later from the power supplied from the +B power supply line L2 and supplies power to the microcomputer 24. The local SW 23 is operated by the user to operate the load 20.

The microcomputer 24 is composed of a well-known CPU (Central Processing Unit) 24A and a flash ROM (Read Only Memory) 24B. The CPU 24A controls the entire master device 2 and performs various processes according to the processing program. The flash ROM 24B is a memory for storing the ID of the slave device 3 connected to the master device 2, the program of processing to be executed by the CPU 24A, and the like.

The semiconductor relays CH21 to CH2$n$ are provided for each of the plurality of slave devices 3 in a one-to-one correspondence. The semiconductor relays CH21 to CH2$n$ are connected to the slave devices 3 for +B, ACC, and IG via the +B power supply line L3, the ACC power supply line L4, and the IG power supply line L5. The semiconductor relays CH21 to CH2$n$ are turned on when a drive signal is outputted from the microcomputer 24 to supply power from the +B power supply line L2 via the +B power supply line L3, the ACC power supply line L4, and the IG power supply line L5 to the corresponding slave device 3.

Incidentally, the semiconductor relays CH21 to CH2$n$ have a current detection function for detecting a current flowing in the semiconductor relays CH21 to CH2$n$, and the detected currents are input to the microcomputer 24.

Next, the configuration of the above-described slave device 3 will be explained. The plurality of slave devices 3 has the same configuration and each has an I/F 31, a power supply circuit 32, a microcomputer 33, a plurality of local SWs 34, and a plurality of semiconductor relays CH31 to CH38. The I/F 31 is an interface for communicating with the master device 2, and capable of inputting and outputting signals corresponding to various communications (CAN, LIN, and other communication methods). The power supply circuit 32 is a circuit that generates a power supply for a microcomputer 33 to be described later from power supplied from the +B power supply line L3, the ACC power supply line L4, and the IG power supply line L5 and supplies power to the microcomputer 33.

The microcomputer 33 is composed of a CPU 33A and a flash ROM 33B. The CPU 33A controls the entire slave device 3 and performs various processes according to the processing program. The flash ROM 33B is a memory for storing an initial ID, a program, a variable, and a setting value of processing to be executed by the CPU 33A, and in the initial state, the same contents are written in all the slave devices 3. The initial ID is a temporary ID, and a transmission initial ID and a reception initial ID are set.

The processing program of the CPU 33A includes a communication program for communicating with the master device 2 connected via the communication line L1 and a system operation program necessary for system operation. The operation program of the load 20 is not written in the flash ROM 33B in the initial state, but is written after setting the ID.

The plurality of local SWs 34 are connected to the microcomputer 33 and input ON/OFF information to the microcomputer 33. The plurality of semiconductor relays CH31 to CH38 are connected between the microcomputer 33 and the loads 20, respectively, and are turned on and off in accordance with a drive signal from the microcomputer 33. When the semiconductor relays CH31 to CH38 turn on, the power from the +B power supply line L3, the ACC power supply line L4, and the IG power supply line L5 are supplied to the loads 20.

Further, the semiconductor relays CH31 to CH38 have a current detection function for detecting the current flowing in the semiconductor relays CH31 to CH38, and the detected currents are input to the microcomputer 33. In the present embodiment, the number of the semiconductor relays CH31 to CH38 provided for the slave device 3 is eight as an example, but the present invention is not limited to this and any number may be used. All the slave devices 3 have the same number of semiconductor relays CH1 to CH8.

Next, the bit assignment of signals exchanged between the master device 2 and the slave device 3 will be described with reference to Table 1 below.

TABLE 1

| ID | | | | | | | | | | |
|---|---|---|---|---|---|---|---|---|---|---|
| installation information | | | reserve | transmission/reception | slave type information | | | | | |
| bit10 | bit9 | bit8 | bit7 | bit6 | bit5 | bit4 | bit3 | bit2 | bit1 | bit0 |
| front: 01 | | right: 01 | | 0 | receive: 0 | | slave1: 0001 | | | |
| rear: 10 | | left: 10 | | | send: 1 | | slave2: 0002 | | | |
| center: 11 | | center: 11 | | | | | . . . | | | |

TABLE 1-continued

|  | slave n: XXXX |||||||
|---|---|---|---|---|---|---|---|
|  | byte<br>Before ID setting: installation information<br>After ID setting: load control information |||||||
|  | bit7 | bit6 | bit5 | bit4 | bit3 | bit2 | bit1 | bit0 |
|---|---|---|---|---|---|---|---|---|
| Before ID setting | ID setting OK: 1<br>ID setting NG: 0 | — | — | — | — | — | — | — |
| After ID setting | CH8 ON: 1<br>CH8 OFF: 0 | CH37 ON: 1<br>CH37 OFF: 0 | CH36 ON: 1<br>CH36 OFF: 0 | CH35 ON: 1<br>CH35 OFF: 0 | CH34 ON: 1<br>CH34 OFF: 0 | CH33 ON: 1<br>CH33 OFF: 0 | CH32 ON: 1<br>CH32 OFF: 0 | CH31 ON: 1<br>CH31 OFF: 0 |

As shown in Table 1 above, the first bit10 to bit0 represents the identification information (ID) of the slave device 3. The identification information is allocated to all the slave devices 3 arranged in the vehicle 10 without overlapping. The identification information is composed of installation information, reserve information, transmission/reception information, and slave type information.

Bit10 to bit7 are allocated to the installation information. Bit10 to bit9 represent installation positions in the traveling direction of the vehicle, and become "01" if the installation position of the slave device 3 is on the front side of the vehicle, "10" if on the rear side, and "11" if at the center in the traveling direction. Bit8 to bit7 represent installation positions in the left-right direction of the vehicle 10, and become "01" if the installation position of the slave device 3 is on the right side of the vehicle 10, "10" in the case of the left side, and "11" in the case of the center in the left-right direction.

Bit6 is allocated to reserve information. The reserve information is always "0".

Bit5 is allocated to the transmission/reception information, becomes "1" when the slave device 3 transmits to the master device 2, and becomes "0" when the slave device 3 receives from the master device 2.

Bit4 to bit0 are allocated to the slave type information. The slave type information is information that is allocated without overlapping with a plurality of slave devices 3 connected to the same master device 2 (but may overlap between the slave devices 3 connected to different master devices 2).

Bit7 to bit0 following the ID indicate load control information after ID setting. Bit 7 to bit 0 are allocated to the semiconductor relays CH38 to CH31 respectively. When each bit n (n is any integer from 0 to 7) is "0", it represents "off" of the semiconductor relay CH 3n+1 assigned to the bit n. When each bit n (n is any integer from 0 to 7) is "1", it represents "on" of the semiconductor relay CH 3n+1 assigned to the bit n.

Prior to ID setting, bit 7 indicates success (OK) and failure (NG) of ID setting which will be described later, and bit 6 to bit 0 are blank.

Next, the ID setting operation of the in-vehicle network 1 having the above-described configuration will be described with reference to the flowcharts of FIGS. 3 to 4. Incidentally, in the initial state (ID is not set), the same initial ID (initial reception ID, initial transmission ID) is set in all the slave devices 3 and stored in the ID area of the flash ROM 33B.

There are two types of IDs set in the slave device 3: a reception ID and a transmission ID, but since the difference between the two is only the transmission/reception information (bit5 of ID) as shown in Table 1, If either is determined, the transmission/reception ID is naturally determined. In the present embodiment, the setting of the reception ID will be described, and as the initial reception ID, it is assumed that "00000011111" which is "0" for bit10 to bit5 and "1" for bit4 to bit0 is set as shown in the following Table 2.

TABLE 2

| ID ||||||||||||
|---|---|---|---|---|---|---|---|---|---|---|---|
| installation information |||| reserve | transmission/<br>reception | slave type information |||||
| bit10 | bit9 | bit8 | bit7 | bit6 | bit5 | bit4 | bit3 | bit2 | bit1 | bit0 |
| 0 | 0 | 0 | 0 | 0 | 0 | 0 | 1 | 1 | 1 | 1 |

In addition, in the initial state, as shown in Tables 3 and 4 below, the reception ID and the transmission ID corresponding to the semiconductor relays CH21 to CH2n are stored in the flash ROM 24B or the like in advance in all the master devices 2. In detail, the installation information of the reception ID and the transmission ID are all set to the same value regardless of the semiconductor relays CH21 to CH2n. For example, when the master device 2 is installed on the front right side of the vehicle 10, the installation information of the ID is "0101" as shown in the following Tables 3 and 4.

TABLE 3

| | ID | | | | | | | | | |
|---|---|---|---|---|---|---|---|---|---|---|
| | installation information | | | | reserve | transmission/ reception | slave type information | | | |
| | bit10 | bit9 | bit8 | bit7 | bit6 | bit5 | bit4 | bit3 | bit2 | bit1 | bit0 |
| CH21 | 0 | 1 | 0 | 1 | 0 | 0 | 0 | 0 | 0 | 0 | 1 |
| CH22 | 0 | 1 | 0 | 1 | 0 | 0 | 0 | 0 | 0 | 1 | 0 |

TABLE 4

| | ID | | | | | | | | | |
|---|---|---|---|---|---|---|---|---|---|---|
| | installation information | | | | reserve | transmission/ reception | slave type information | | | |
| | bit10 | bit9 | bit8 | bit7 | bit6 | bit5 | bit4 | bit3 | bit2 | bit1 | bit0 |
| CH21 | 0 | 1 | 0 | 1 | 0 | 1 | 0 | 0 | 0 | 0 | 1 |
| CH22 | 0 | 1 | 0 | 1 | 0 | 1 | 0 | 0 | 0 | 1 | 0 |

In the slave type information of the reception ID and the transmission ID, values corresponding to the semiconductor relays CH21 to CH2n are stored. For example, "00001", "00010", . . . are set as slave type information corresponding to the semiconductor relays CH21, CH22. In this case, as shown in Tables 3 and 4 above, "01010000001", "01010000010", . . . are stored as the reception IDs corresponding to the semiconductor relays CH21, CH22 . . . , and "01010100001", "01010100010" . . . are stored as the transmission IDs.

First, the microcomputer 24 (hereinafter may be simply referred to as the master device 2) of the master device 2 executes the ID setting process shown in FIG. 3 after starting, and the ID setting processing (steps S1 to Sn) of the slave devices 3 connected to the semiconductor relays CH21 to CH2n in order.

Figure 3:
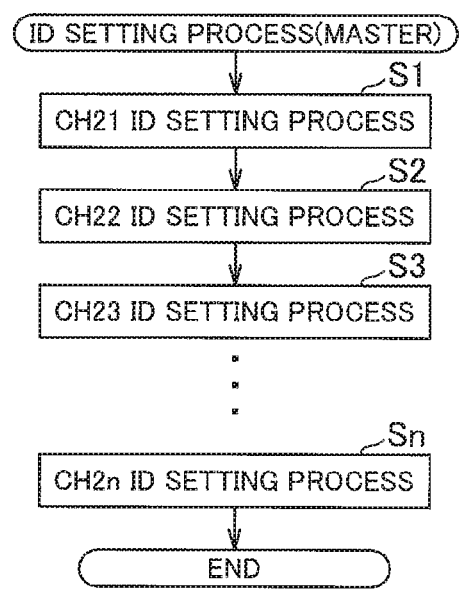
FIG. 3 is a flowchart showing an ID setting process procedure executed by the master device shown in FIG. 1.
Figure 4:
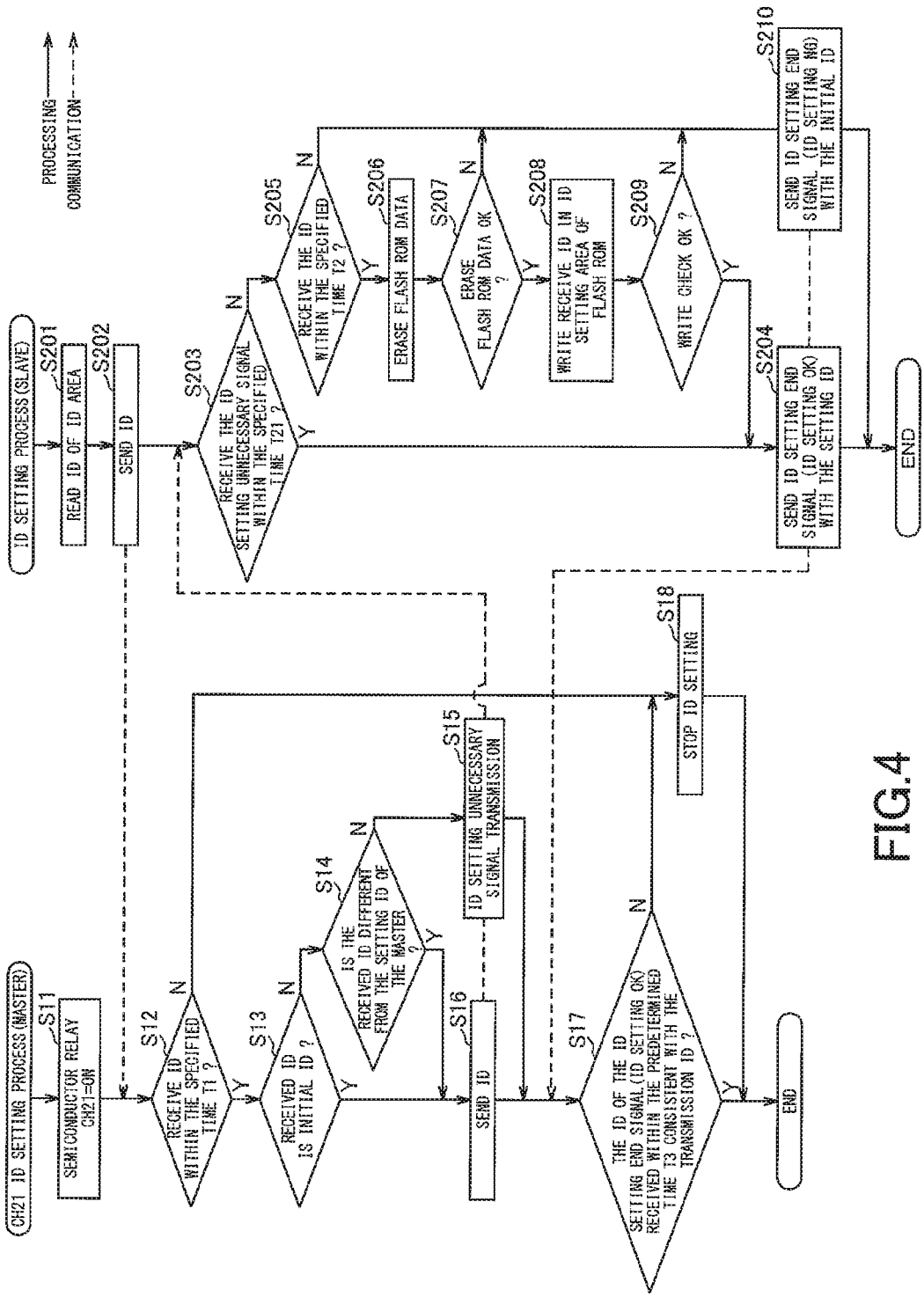
FIG. 4 is a flowchart showing an ID setting process procedure for +B executed by the master device and the slave device shown in FIG. 1.

In the ID setting process of the slave device 3 connected to the semiconductor relay CH21, the master device 2 first turns on the semiconductor relay CH21 (step S1 in FIG. 3). Power is supplied to the slave device 3 connected to the semiconductor relay CH21 in response to turning on of the semiconductor relay CH21.

The microcomputer 33 (hereinafter may be simply referred to as the slave device 3) of the slave device 3 connected to the semiconductor relay CH21 is activated when power is supplied and executes the ID setting process shown in FIG. 4. In the ID setting process, the slave device 3 first reads its own ID stored in the ID area of the flash ROM 33B (step S201). Next, the slave device 3 transmits the read ID (step S202).

If the master device 2 cannot receive the ID within the predetermined time T1 after turning on the semiconductor relay CH21 in step S11 (step S12), the master device 2 determines that there is no slave device 3 connected to the semiconductor relay CH21, and after stopping the ID setting (Step S18), and ends the process. On the other hand, when receiving the ID within the predetermined time T1 (Y in step S12), the master device 2 determines whether the received ID is the initial ID (step S13).

If not the initial ID (N in step S13), the master device 2 determines whether the received ID is different from the ID (01010000001 in the example shown in Table 3) corresponding to the semiconductor relay CH21 stored in the flash ROM 24B (Step S14). If the two match (N in step S14), the ID setting unnecessary signal is transmitted with the matching ID "01010000001" (step S15), and the flow proceeds to step S17. The ID setting unnecessary signal is a signal in which the bit 7 of the byte is set to "1" and the bit 6 to the bit 0 to "0" to the matched ID as shown in the following Table 5.

TABLE 5

| ID | | | | | | | | | | |
|---|---|---|---|---|---|---|---|---|---|---|
| installation information | | | | reserve | transmission/ reception | slave type information | | | | |
| bit10 | bit9 | bit8 | bit7 | bit6 | bit5 | bit4 | bit3 | bit2 | bit1 | bit0 |
| 0 | 1 | 0 | 1 | 0 | 0 | 0 | 0 | 0 | 0 | 1 |
| byte | | | | | | | | | | |
| | bit7 | bit6 | bit5 | bit4 | bit3 | bit2 | bit1 | bit0 | | |
| | 1 | 0 | 0 | 0 | 0 | 0 | 0 | 0 | | |

On the other hand, if the ID received in step S13 is the initial ID (Y in step S13), the master device 2 proceeds to step S16. Even if the received ID and the ID corresponding to the semiconductor relay CH 21 stored in the flash ROM 24B are different (Y in step S14), the master device 2 also proceeds to step S16.

In step S16, the CPU 24A of the master device 2 functions as a transmitter, reads the ID corresponding to the semiconductor relay CH21 from the flash ROM 24B, and transmits the read ID. At this time, as shown in the following Table 6, the CPU 24A sets the bit 7 of the byte to be transmitted together with the ID to "0".

TABLE 6

| ID | | | | | | | | | | |
|---|---|---|---|---|---|---|---|---|---|---|
| installation information | | | | reserve | transmission/ reception | slave type information | | | | |
| bit10 | bit9 | bit8 | bit7 | bit6 | bit5 | bit4 | bit3 | bit2 | bit1 | bit0 |
| 0 | 1 | 0 | 1 | 0 | 0 | 0 | 0 | 0 | 0 | 1 |

| byte | | | | | | | |
|---|---|---|---|---|---|---|---|
| bit7 | bit6 | bit5 | bit4 | bit3 | bit2 | bit1 | bit0 |
| 0 | 0 | 0 | 0 | 0 | 0 | 0 | 0 |

When the slave device 3 receives an ID setting unnecessary signal (that is, a signal of which bit 7 of byte is "1") within a predetermined time T2 after transmitting the ID (Y in step S203), the slave device 3 transmits the ID written in the ID area (ID setting OK) (step 204), and finishes the ID setting process. The ID setting end signal (ID setting OK) has the same configuration as the ID setting unnecessary signal shown in Table 5, and is a signal with bit 7 of byte set to "1".

On the other hand, when receiving the ID (that is, the signal of bit 7 of byte being "0") within the predetermined time T2 (Y at step S205), the slave device 3 erases the initial ID from the ID area of the flash ROM 33B S206). When the erasure of the ID area of the flash ROM 33B succeeds (Y in step S207), the CPU 33A of the slave device 3 functions as a setting unit and writes the received reception ID in the ID area of the flash ROM 33B (step S208).

Next, when the received ID matches the received ID written in the flash ROM 33B and the writing is determined to be successful (Y in step S209), the slave device 3 proceeds to step S204.

In step S204, the slave device 3 transmits an ID setting end signal (ID setting OK) with the ID written in the flash ROM 33B. The ID setting end signal (ID setting OK) is a signal whose bit 7 of the byte is "1" as shown in Table 5.

On the other hand, when the slave device 3 cannot receive the ID within the predetermined time T2 (N in step S205), when the erasure of the flash ROM 33B fails (N in step S207), or when the ID writing fails (N in step S209), the process proceeds to step S210.

In step S210, the slave device 3 transmits an ID setting end signal (ID setting NG) with the initial ID. The ID setting end signal (ID setting NG) is a signal whose bit 7 of the byte is "0" as shown in the following Table 7.

TABLE 7

| ID | | | | | | | | | | |
|---|---|---|---|---|---|---|---|---|---|---|
| installation information | | | | reserve | transmission/ reception | slave type information | | | | |
| bit10 | bit9 | bit8 | bit7 | bit6 | bit5 | bit4 | bit3 | bit2 | bit1 | bit0 |
| 0 | 0 | 0 | 0 | 0 | 0 | 0 | 1 | 1 | 1 | 1 |

| byte | | | | | | | |
|---|---|---|---|---|---|---|---|
| bit7 | bit6 | bit5 | bit4 | bit3 | bit2 | bit1 | bit0 |
| 0 | 0 | 0 | 1 | 0 | 0 | 0 | 0 |

When the master device 2 receives the ID setting end signal (ID setting OK) within the predetermined time T3 after transmitting the ID or the ID setting unnecessary signal, if the ID matches the ID transmitted in the steps S16 and S15 (step Y in S17), the processing is terminated.

On the other hand, when the master device 2 cannot receive the ID setting end signal (ID setting OK) within the predetermined time T3 or if the ID does not match the ID transmitted in S16 and S15 even if the ID can be received (N in step S17), the ID setting is canceled (step S18), and the process is terminated.

Next, the ID setting process (steps S2 to Sn) of the slave device 3 connected to the semiconductor relays CH22 to CH2n will be described. In the ID setting process of the slave device 3 connected to the semiconductor relays CH22 to CH2n, the master device 2 is the same as the ID setting process of the slave device 3 connected to the semiconductor relay CH21 and therefore will be briefly described. In the ID setting process of the slave device 3 connected to the semiconductor relays CH22 to CH2n, the master device 2 turns on the semiconductor relays CH22 to CH2n instead of turning on the semiconductor relay CH21 in step S11.

When power is supplied to the slave device 3 connected to the semiconductor relays CH22 to CH2n in response to the turning on of the semiconductor relays CH22 to CH2n, the slave device 3 executes the above-described ID setting process.

According to the embodiment described above, the master device 2 is provided with a plurality of semiconductor relays CH21 to CH2n provided for each of the plurality of slave devices 3 and supplying power to the corresponding slave device 3, and the flash ROM 24B that stores an ID corresponding to the plurality of semiconductor relays CH21 to CH2n. The master device 2 turned on the semiconductor relays CH21 to CH2n sequentially and transmits the corresponding ID each time the semiconductor relays CH21 to CH2n are turned on. The slave device 3 sets the ID received after power supply as its own ID. That is, according to the present embodiment, after the master device 2 and the slave device 3 are assembled and connected to the in-vehicle network 1, ID setting can be performed by turning on and off the semiconductor relays CH21 to CH2n. Thereby, since it is not necessary to assign an ID each time the slave device 3 is connected (assembled), it is possible to shorten the setting time of the ID and to reduce erroneous settings.

According to the above-described embodiment, the master device 2 is installed in the vehicle 10, and the plurality of slave devices 3 are connected to the plurality of loads 20. The plurality of loads 20 are classified into a load 20 that can be driven at all times, a load 20 that can be driven when an accessory is used, and a load 20 that can be driven at the time of ignition. Then, the same kind of load 20 is connected to one slave device 3. Thus, it is possible to set the ID by using the semiconductor relays CH21 to CH2n for supplying the power to the slave device 3 and enabling the load 20 to be driven.

According to the above-described embodiment, a plurality of master devices 2 are installed in the vehicle 10, and the IDs stored in the flash ROM 24B include installation information indicating the installation position of the master device 2 in the vehicle. Thus, it is possible to easily assign different IDs to the slave devices 3 set in the vehicle 10.

It should be noted that the present invention is not limited to the above embodiment. That is, various modifications can be made without departing from the gist of the present invention.

REFERENCE SIGNS LIST

1 in-vehicle network (communication system)
2 master device
3 slave device
10 vehicle
20 load
CH21 to CH2n semiconductor relay (switch)
24A CPU (transmission unit)
24B flash ROM (memory unit)
33A CPU (setting unit)

The invention claimed is:

1. A communication system comprising a plurality of slave devices and a master device that communicates with the plurality of slave devices,
   wherein the master device includes: a plurality of switches in the master device, provided for each of the plurality of slave devices, for supplying power to the corresponding slave devices; a storage unit for storing identification information corresponding to the plurality of switches; and a transmission unit that transmits corresponding identification information each time the switch is turned on by sequentially turning on the switch,
   wherein the plurality of slave devices has a setting unit that sets the identification information received after power supply as its own identification information
   wherein the master device is installed in a vehicle,
   wherein the plurality of slave devices is connected to a plurality of loads,
   wherein the plurality of loads are classified into a load that can be driven at all times, a load that can be driven when an accessory is used, and a load that can be driven at the time of ignition, and
   wherein the loads of the same type are connected to one of the slave devices.

2. The communication system as claimed in claim 1,
   wherein a plurality of the master devices is installed in a vehicle, and
   wherein the identification information stored in the storage unit includes installation information indicating an installation position of the master device in the vehicle.

3. A master device communicating with a plurality of slave devices, comprising:
   a plurality of switches in the master device, provided for each of the plurality of slave devices and supplying power to the corresponding slave devices;
   a storage unit for storing identification information corresponding to the plurality of switches;
   a transmission unit that transmits corresponding identification information corresponding to the switches each time the switches are turned on by sequentially turning on the switches,
   wherein the master device is installed in a vehicle,
   wherein the plurality of slave devices is connected to a plurality of loads,
   wherein the plurality of loads is classified into a load that can be driven at all times, a load that can be driven when an accessory is used, and a load that can be driven at the time of ignition, and
   wherein the loads of the same type are connected to one of the slave devices.

* * * * *